Jan. 9, 1945.  R. L. STERN  2,366,880
PRODUCTION OF NITROCELLULOSE
Filed March 10, 1942
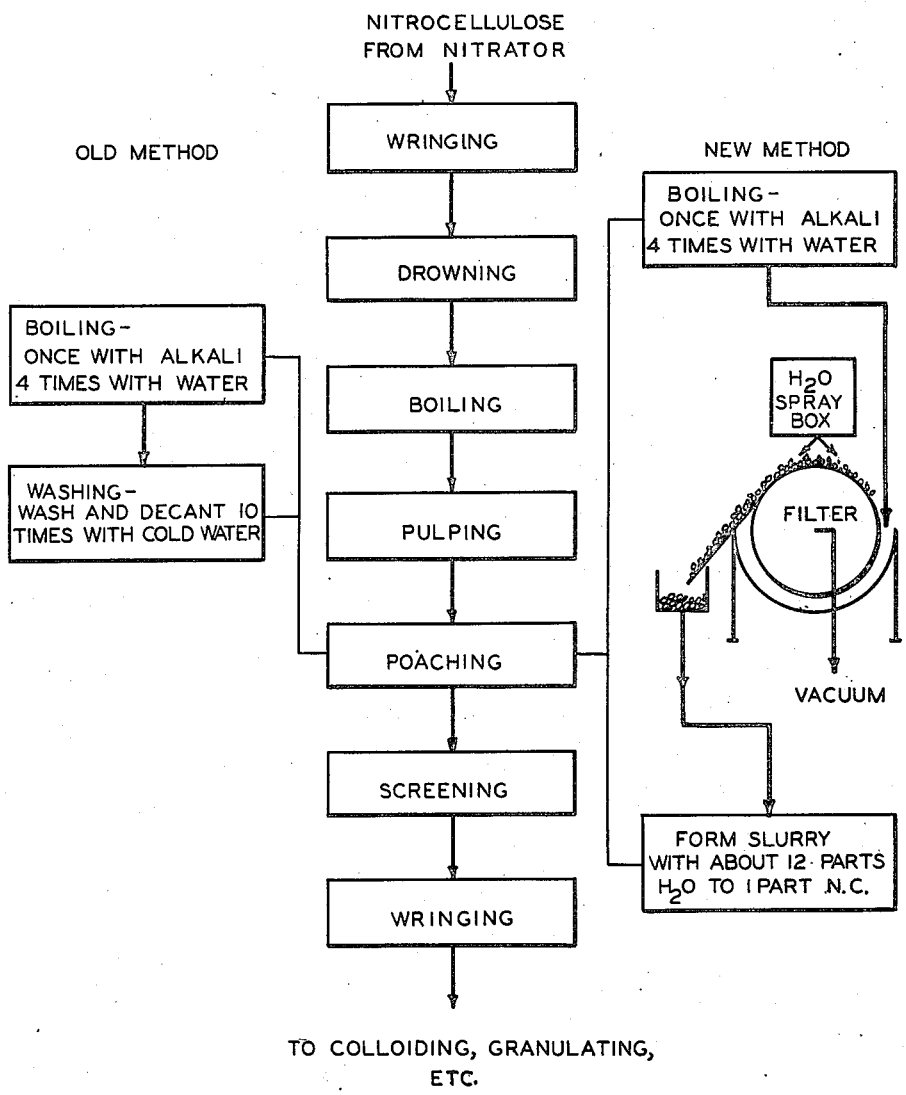
Raphael L. Stern
INVENTOR.
BY

UNITED STATES PATENT OFFICE 2,366,880

PRODUCTION OF NITROCELLULOSE

Raphael L. Stern, South River, N. J., assignor to Hercules Powder Company, Wilmington, Del., a corporation of Delaware Application March 10, 1942, Serial No. 434,060

10 Claims. (Cl. 260—223)

This invention relates to a process for preparing nitrocellulose and more particularly to a poaching process for use in the manufacture of nitrocellulose, especially for use in the manufacture of smokeless powder.

The manufacture of smokeless powder is accomplished by the following processes or steps: Purification and mechanical preparation of raw cotton or cotton linters; nitration of the cotton with nitric and sulfuric acid, thus producing nitro-cellulose; pulping; purification of the nitrocellulose to free it from the acids and low nitrates; mixing of the nitrocellulose with ether and alcohol and pressing to form a colloid; granulating; drying and blending.

The steps of purification of the nitrocellulose includes the following processes: Preliminary boiling, pulping, poaching, screening, and wringing. The requirements for commercial nitrocellulose and particularly for smokeless powder are for such a high quality product that these purification processes are particularly important. It is impossible with the present limited knowledge of the cellulose molecule and of the various reactions occurring during nitration to control the reaction to such an extent that nitrocellulose consisting of but one nitro-body will result from a certain reaction accomplished under a standard set of conditions. The reaction products always include certain nitrocelluloses of lower nitrogen content, sulfates, and other impurities. These bodies, usually acidic, influence the stability of the whole mass and must therefore be removed before the desired stability of the nitrocellulose can be obtained. The object of the purification treatment is to insure a uniform stability by eliminating through hydrolysis, washing, or other means these unstable nitrobodies and other impurities.

The present invention is directed to the purification step and is particularly concerned with the poaching process. Poaching as now practiced consists first in a boiling treatment which is carried out in several steps using first an alkaline solution, usually of sodium carbonate, and of several boilings with water. It has been the practice after these boilings to treat the nitrocellulose with at least ten cold water washings. The wash is accomplished by decanting 40% of clear supernatant liquid off the top of a tub of settled nitrocellulose, replacing the drained liquid with fresh water, agitating the nitrocellulose with the fresh water, allowing the nitrocellulose to settle, and then repeating the decanting for another wash. These ten water washings entail certain disadvantages. They consume a very large amount of water and with each decantation a large amount of the nitrocellulose is lost. The ten washings and decantations require considerable time and cut down the possible production in the poacher house. It is evident that these water washes purify by simply diluting the contaminants to a low level. Finally, while the product is of a fine quality as measured by the KI, German, and nitrite tests, there is room for improvement.

The disadvantages of the old method are overcome by the present invention which relates to the use of a filter in the poaching process, the filter is preferably of the continuous vacuum type as will be more fully described. The filtration is accompanied by a wash with a light spray of water and is preferably followed by a dilution of the nitrocellulose of about 12 parts of water to 1 part of nitrocellulose before the final screening and wringing processes.

Referring to the drawing which is a diagrammatic representation of the purification step, the processes of wringing, drowning, boiling, pulping, poaching, screening, and wringing are shown in their proper sequence. The poaching process is shown as comprising the boiling and cold water washings of the old method and the boiling, filtering, and diluting of the present invention.

The following is an example of a method of carrying out the process of the invention: a batch of 3,000 pounds of nitrocellulose from the pulping process was boiled in a vat with about 8,000 gallons of a water solution containing 5 to 10 pounds of sodium carbonate per 1,000 pounds nitrocellulose. The carbonate solution was decanted and the boiling process repeated four times with water. After the last decantation, more water (filtrate water may be used) was added until a 1% nitrocellulose concentration was reached. This slurry was pumped to a continuous rotary drum filter having a 7 inch vacuum (mercury). The drum was rotated so that the nitrocellulose was exposed to the vacuum for 10 seconds. Meanwhile, a fine spray of water from a spray box was sprayed on the nitrocellulose. The nitrocellulose from the filter drum was then diluted with 12 parts of water to 1 part nitrocellulose and passed to the screening process.

The filtering is preferably accomplished on a continuous vacuum filter of the Oliver or Impco type to which is continuously delivered the slurry from the poachers. The concentration of the slurries arriving at the filter is preferably adjusted by recycling the filtrate into the feed so as not to exceed a 7% nitrocellulose content, although a 1% slurry is most desirable. Nitrocellulose concentrations higher than 7% result in a cake which is too thick to allow proper washing. Concentrations substantially less than ½% form cakes which are too thin for proper washing and cause a greater loss of nitrocellulose in the waste water. The slurry is constantly agitated within the filter to prevent the nitrocellulose from settling out into the bottom of the filter.

The vacuum in the filter may vary considerably but in order to obtain a product with the highest KI time it is desirable to use a vacuum of between about 3 inches and about 15 inches of mercury, the 7 inch vacuum being most desirable for practical purposes. The speed of the cylinder may be varied but a speed of between 4 R. P. M. and 6 R. P. M. for a 5 foot diameter filter drum has been found most desirable where the cylinder is about 50% immersed in the slurry.

The following table shows the results of the P. P. M. of nitrite and KI tests.

TABLE I

*Stability and nitrite content of nitrocellulose*

| Treatment | Wash | P. P. M. nitrite | KI test |
|---|---|---|---|
| | *Seconds* | | |
| None: As received at filter | | 7.2 | 5 |
| Filter wash 7 inch vacuum | 10 | 0.4 | 75 |
| Do | 5 | 0.5 | 55 |
| Ten cold water wash | | 0.5 | 55 |

The amount of water used to wash the nitrocotton in the filter was approximately 0.70 gal./lb. of nitrocellulose. The old process of the ten cold water washings requires about 6 gallons of water per pound of nitrocellulose.

The following table shows a comparison of the percentage of nitrite left after filter washing and that remaining after ten cold water washings. The figures are taken from tests on ten batches of nitrocellulose with various ranges of nitrites.

TABLE II

*NO₂ left after ten cold water washes*

| Low | High |
|---|---|
| 0.49 | 3.13 |

*NO₂ left after filter washing*

| Low | High |
|---|---|
| 0.153 | 0.557 |

It was found most desirable in order to prevent the spray from tending to wash the nitrocellulose off the filter to use a fine spray of water from a spray box located only a few feet above the filter so that the pressure of the water was slight.

A final dilution of the filtered nitrocellulose to a slurry with about 12 parts of water before the final screening and wringing processes to 1 of nitrocellulose was found to further reduce the P. P. M. of nitrite and facilitate handling.

The excellent results obtained by the present process are unexpected because it was previously thought that several washes and decantations were necessary to remove fine insoluble particles of a specific gravity above or below that of the nitrocellulose which were believed to effect the purity of the product. Also, it was thought that long contact with water was necessary to remove impurities embedded in the fiber.

While the present invention is intended to be applicable to nitrocellulose generally, it is particularly applicable to smokeless nitrocellulose or smokeless powder. The nitrocellulose for smokeless powder contains 12.6% or more of nitrogen, while nitrocellulose for other uses such as lacquer, gelatin dynamite, etc., may contain lesser percentages of nitrogen. It is particularly applicable to smokeless nitrocellulose because this type of nitrocellulose must be of the highest purity and the problems of purification are greater than for ordinary purposes.

Thus, the present invention has the unexpected advantage that it reduces the amount of water consumed by the ordinary poaching process which consequently reduces the amount of nitrocellulose yield loss while, at the same time, giving considerably more efficient washing, effectively reducing the P. P. M. of nitrite and increasing the time of the KI test. Also, the capacity of the poacher house is increased in some cases by as much as 30% because of the reduction in time required.

What I claim and desire to protect by Letters Patent is:

1. In a poaching process in the manufacture of nitrocellulose comprising boiling nitrocellulose in an aqueous alkaline solution and boiling the nitrocellulose at least once in water, the step of separating the nitrocellulose from the liquor associated therewith after said boiling by continuously filtering to form a mat and washing the resulting mat with water, employing in said step a slurry containing from about ½% to about 7% nitrocellulose, whereby there is obtained in a single brief wash treatment with a small amount of water a highly stable nitrocellulose product.

2. In a poaching process in the manufacture of nitrocellulose comprising boiling nitrocellulose in an aqueous alkaline solution and boiling the nitrocellulose at least once in water, the step of separating the nitrocellulose from the liquor associated therewith after said boiling by continuously filtering to form a mat and washing the resulting mat with not more than one gallon of water per pound of nitrocellulose, employing in said step a slurry containing from about ½% to about 7% nitrocellulose, whereby there is obtained in a single brief wash treatment with a small amount of water a highly stable nitrocellulose product.

3. In a poaching process in the manufacture of nitrocellulose comprising boiling nitrocellulose in an aqueous alkaline solution and boiling the nitrocellulose at least once in water, the step of separating the nitrocellulose from the liquor associated therewith after said boiling by continuously filtering to form a mat under a vacuum of from about 3 to about 15 inches of mercury and washing the resulting mat by spraying with water at low pressure, employing in said step a slurry containing from about ½% to about 7% nitrocellulose, whereby there is obtained in a single brief wash treatment with a small amount of water a highly stable nitrocellulose product.

4. In a poaching process in the manufacture of nitrocellulose comprising boiling nitrocellulose in an aqueous alkaline solution and boiling the nitrocellulose at least once in water, the step of separating the nitrocellulose from the liquor associated therewith after said boiling by continuously filtering to form a mat and washing the resulting mat with water, employing in said step a slurry containing about 1% nitrocellulose, whereby there is obtained in a single brief wash treatment with a small amount of water a highly stable nitrocellulose product.

5. In a poaching process in the manufacture of nitrocellulose comprising boiling nitrocellulose in an aqueous alkaline solution and boiling the nitrocellulose at least once in water, the step of separating the nitrocellulose from the liquor associated therewith after said boiling by continuously filtering to form a mat under a vacuum of about 7 inches of mercury and washing the resulting mat with about 0.7 gallon of water per pound of nitrocellulose, employing in said step a slurry containing from about ½% to about 7% nitrocellulose, whereby there is obtained in a single brief wash treatment with a small amount of water a highly stable nitrocellulose product.

6. In a poaching process in the manufacture of nitrocellulose comprising boiling nitrocellulose in an aqueous alkaline solution and boiling the nitrocellulose at least once in water, the step of separating the nitrocellulose from the liquor associated therewith after said boiling by continuously filtering with a vacuum filter to form a mat and washing the resulting mat with a fine spray of water under low pressure, employing in said step a slurry containing from about ½% to about 7% nitrocellulose, whereby there is obtained in a single brief wash treatment with a small amount of water a highly stable nitrocellulose product.

7. In a process for the purification of nitrocellulose which comprises wringing, drowning, boiling, pulping, poaching, screening, and wringing nitrocellulose, a poaching process which comprises boiling the nitrocellulose in an aqueous alkaline solution, boiling the nitrocellulose at least once in water, separating the nitrocellulose from the liquor associated therewith after said boiling by continuously filtering to form a mat and washing the resulting mat with water, employing in said step a slurry containing from about ½% to about 7% nitrocellulose, whereby there is obtained in a single brief wash treatment with a small amount of water a highly stable nitrocellulose product.

8. In a poaching process in the manufacture of smokeless nitrocellulose having a nitrogen content of about 12.6% comprising boiling nitrocellulose in an aqueous alkaline solution and boiling the nitrocellulose at least once in water, the step of separating the nitrocellulose from the liquor associated therewith after said boiling by continuously filtering to form a mat and washing the resulting mat with water, employing in said step a slurry containing from about ½% to about 7% nitrocellulose, whereby there is obtained in a single brief wash treatment with a small amount of water a highly stable nitrocellulose product.

9. In a poaching process in the manufacture of nitrocellulose comprising boiling nitrocellulose in an aqueous alkaline solution and boiling at least once in water, the step of separating the nitrocellulose from the liquor associated therewith after said boiling by continuously forming a mat from the nitrocellulose in the form of a water slurry containing from about ½% to about 7% nitrocellulose on a continuous filter surface and washing the resulting mat with water while drawing off the liquor and water through the mat, whereby there is obtained in a single brief wash treatment with a small amount of water a highly stable nitrocellulose product.

10. In a poaching process in the manufacture of nitrocellulose comprising boiling nitrocellulose in an aqueous alkaline solution and boiling the nitrocellulose at least once in water, the step of separating the nitrocellulose from the liquor associated therewith after said boiling by continuously filtering on a rotary drum-type vacuum filter to form a mat and washing the resulting mat with water, employing in said step a slurry containing from about ½% to about 7% nitrocellulose, whereby there is obtained in a single brief wash treatment with a small amount of water a highly stable nitrocellulose product.

RAPHAEL L. STERN.